Sept. 1, 1970 F. T. ANDREWS, JR., ET AL 3,526,729

TRANSMISSION MEASURING SYSTEM WITH HARMONIC GENERATING MEANS

Filed April 13, 1966 2 Sheets-Sheet 1

INVENTORS F. T. ANDREWS JR
D. MITCHELL
BY R. O. Nimz
ATTORNEY

TRANSMISSION MEASURING SYSTEM WITH HARMONIC GENERATING MEANS

Filed April 13, 1966 2 Sheets-Sheet 2

United States Patent Office 3,526,729
Patented Sept. 1, 1970

3,526,729

TRANSMISSION MEASURING SYSTEM WITH HARMONIC GENERATING MEANS

Frederick T. Andrews, Jr., Berkeley Heights, and Doren Mitchell, Martinsville, N.J., assignors to Bell Telephone Laboratories, Incorporated, New York, N.Y., a corporation of New York Filed Apr. 13, 1966, Ser. No. 542,336
Int. Cl. H04m *5/00*
U.S. Cl. 179—175.3 8 Claims

ABSTRACT OF THE DISCLOSURE

A system is described which utilizes a remotely located harmonic generator which gives rise to harmonic signals in response to locally applied signals of known frequency content. By measuring the harmonic content present locally, it is possible to derive an indication of conditions existing at the remote location or on the telephone subscriber's loop connecting the local and remote locations. Said harmonic generator consists of a diode placed across said subscriber's loop such that it is normally back biased by the talking battery.

This invention relates to apparatus for measuring the performance of a wire transmission medium and more particularly for measuring the performance of a telephone channel; still more particularly this invention is directed to detecting subscriber lines having degraded transmission characteristics and actual or incipient faults.

An important part of telephone plant maintenance involves the testing and repair of the various wire paths interconnecting telephone terminals and switching centers. The testing of wire paths or trunks which are terminated at each end at telephone company switching centers is a well developed art. The presence at these locations of maintenance craftsmen or, in their absence, of rather sophisticated testing equipment, is justified by the ease of accessibility and high usage of the trunks.

The testing of those wire paths between switching centers and individual subscriber locations, however, offer unique difficulties. Easy accessibility can be had only at the end terminated on telephone company premises. The very large number of subscribers in a telephone system requires that no expensive testing equipment be installed at each customer's premises. Because of the lack of redundancy in the subscriber lines, serious difficulties must be anticipated rather than detected after they have occurred. It is of course, of economic importance that a craftsman not be required to visit each subscriber's premises to effect routine testing. To make most efficient use of testing equipment, testing must be possible whenever the subscriber set is not in use. On the other hand, it is desirable not to prevent a subscriber from using his set whenever he wishes. Of course, the testing means employed should not detract from the transmission characteristics of a channel when normal use is being made of it.

Existing methods of routinely testing subscriber lines are largely limited to direct current tests. That is, loop measurements are made by applying a battery at a telephone central office and measuring resistance between conductors and between each conductor and ground. When installing a subscriber telephone set or when checking a trouble report, a craftsman at the customer premises may cause a signal from the central office to be generated. This may take the form of an alternating current tone sent at a constant frequency or continuously-swept frequency. In either of the latter two methods, an objective measure of the quality of transmission can be determined. These preferred types of measurement, however, have heretofore required either human intervention or elaborate testing equipment at the customer's premises.

Accordingly, it is an object of the present invention to provide improved means for testing telephone subscriber's lines without requiring human intervention at the customer's premises.

It is another object to provide simplified means for indicating the transmission quality of a wire communication channel.

It is another object to provide economical means for testing the loss of a telephone subscriber loop.

It is another object to provide simplified telemetry means employing a wire communication channel.

According to a basic embodiment of the present invention, a diode having known nonlinear characteristics is connected across a subscriber line adjacent to the subscriber set. A source of alternating current signals at a constant frequency $f_1$ and known power is connected across the subscriber line at the central office. Because of the nonlinearity of the diode, harmonics of $f_1$ are produced. By knowing the amount of harmonic power present at the central office, it is possible to calculate the one-way transmission loss between the central office and subscriber station.

A complete description of a particular embodiment of the invention is presented in the following portion of the specification in conjunction with the appended drawings in which:

FIG. 1 presents a simplified embodiment of the present invention;

Figure 1:
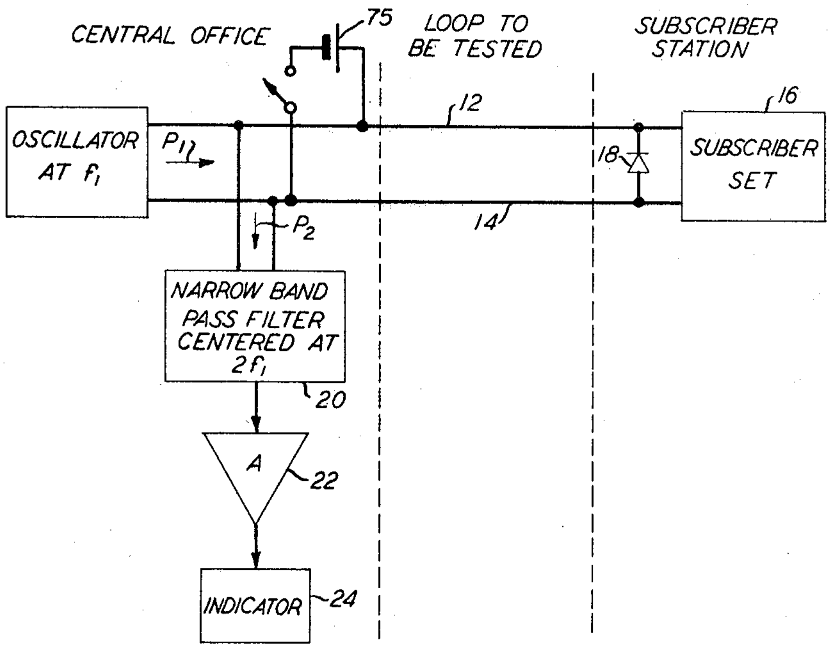

FIG. 1 shows a source of oscillating signals 10 having frequency $f_1$ and power $P_1$ connected across the subscriber loop to be tested at the central office. This loop comprises two substantially identical conductors 12 and 14. Connected across the other end of the loop, in parallel with the on-hook subscriber set 16, is shown a diode 18. Also shown connected across the loop at the central office is a narrow bandpass filter 20 having center frequency $2f_1$. The output of this filter is connected to an amplifier 22 for amplifying harmonic signals and then to an indicating device 24.

When a signal sent from the central office at frequency $f_1$ and power $P_1$ arrives at the subscriber location, it has undergone attenuation of magnitude $L_1$ db. Thus, if $P_1$ is expressed in dbm, the power incident at the subscriber set is $(P_1—L_1)$ dbm.

The presence of the diode at the subscriber end of the line serves to introduce harmonics of the frequency of the incident signal. The relative amount of each harmonic present is of course a function of the exact nature of the nonlinearity of the diode being used. However, within predictable ranges, the relative power of each harmonic is constant for a given type of diode. The diode shown in FIG. 1 is assumed to have a square law characteristic so that the difference, $L_2$, between the incident power at $f_1$ and the power present at the second harmonic $2f_1$ is given approximately by $$L_2=K-(P_1-L_1)\text{ db} \quad (1)$$

where K is a constant characteristic of the diode. The signal at frequency $2f_1$ then experiences a one-way loss assumed to be the same at frequency $2f_1$ as it was at $f_1$. The power $P_2$ present at the central office at frequency $2f_1$ is then given by $$P_2=P_1-2L_1-L_2\text{ dbm} \quad (2)$$

This may be written as a power difference as $$P_1-P_2=2L_1+L_2\text{ db} \quad (3)$$

When the value $L_2$ is substituted and the last equation is solved for $L_1$ the result is $$L_1=\frac{2P_1-P_2+K}{3} \quad (4)$$

A narrow bandpass filter 20 is used to isolate the power at the desired harmonic frequency and an amplifier 22 is used to increase this power to a level useful to the indicating device 24. It is clear that, by knowing the transmitting power $P_1$ and the diode constant K, and measuring the harmonic power $P_2$, it is possible to easily calculate the loss $L_1$.

It is assumed that, when a normal call is in progress, the central office talking battery 75 is applied with its positive terminal connected to the top wire 12 and a negative terminal to the lower wire of the pair 14. If the subscriber were to go off hook, the diode would therefore be reverse biased and effectively out of the talking circuit. No impairment of the talking path would therefore be experienced.

The second harmonic was selected in the above discussion only because a diode produces signals particularly rich in second harmonic content. Other harmonics could, of course, be used although, generally speaking, the higher order harmonics are possessed of relatively less energy. For the higher order harmonics, then, there would be a higher probability of obscuring the actual signal in noise present on the channel in the band about the selected harmonic.

The amplifier 22 in FIG. 1 may be of any standard linear type. The indicator means 24 could take any one of many forms depending on the system to which the subscriber is connected and the type of test performed. If a manual test of a troublesome line is being made the indicator might be a standard power meter. The simple calculation indicated aboue in Equation 4 could then be performed to determine the loss $L_1$. Alternatively, since the only variable in the calculation is the received power $P_2$ the meter could be calibrated directly in terms of $L_1$. If an automated routine test of many lines were to be performed, the procedure could be correspondingly automated.

The present invention allows a true end-to-end attenuation measurement to be performed. Previously used methods, excepting those requiring human participation at the subscriber location, are essentially input impedance measuring techniques and do not indicate the power actually reaching the remote location. Here, the signal energy at the central office at the selected harmonic frequency is uniquely determined by the power received at the subscriber location. The result achieved is then equivalent to having a tone generator of known power at the remote location and making a received power measurement at the central office. Although contrary to the assumption used in deriving Equation 4, it will sometimes happen that the signal at the second harmonic will be attenuated to a greater or lesser degree than the fundamental signal. For a given facility, however, this discrepancy would be a predictable function. Thus, in any event, the attenuation experienced is indicative of the channel transmission quality.

To prevent impedance effects from causing erroneous indications, it might be advisable in some cases to perform a number of measurements at different input powers $P_1$. Some standard averaging technique could then be applied to the individual results to eliminate any bias introduced by such impedance anomalies. It may also prove desirable in some cases to use more than one fundamental frequency $f_1$. This will avoid testing the line exclusively at or near what might be a resonant or antiresonant frequency. Likewise, particularly if storage is available in the testing system, comparisons with previous readings could automatically be made to detect possible developing trouble areas. Such comparisons could also be used to advantage to show variations of performance as a function of external factors such as seasonal weather. If a harmonic path threshold is established and testing made to yield only a pass-no-pass result, appropriate compensation could, of course, be made for such external factors.

Figure 2:
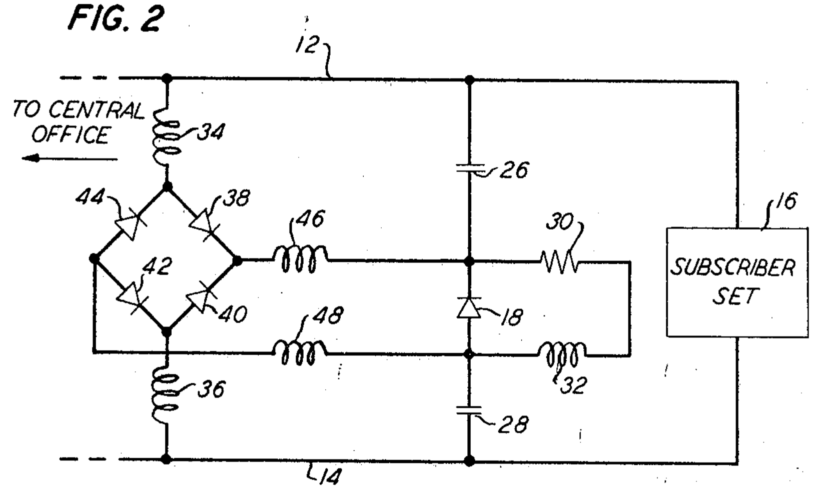
FIGS. 2 and 3 show modifications to the basic configuration for use under certain operating conditions.

It was assumed above that the central office battery has a fixed polarity. If this were true, the diode could always be placed so as to be reverse biased whenever the subscriber set is in normal use. It happens, however, that for various reasons the central office battery may be reversed while in normal operation. FIG. 2 shows certain additions to the equipment at the subscriber location that will allow the fundamental concept to be applied to such lines.

When a measurement is being made on the wire facility 12 and 14, the alternating current signal passes through the capacitors 26 and 28 and the diode 18. If no other action were taken, the rectification introduced by the diode would charge the capacitors toward the peak value of the alternating current voltage. This would tend to reverse bias the diode 18 and prevent a measurement on the loop. Accordingly, an alternative direct current path is provided by the resistor 30 and inductor 32.

The diode is effectively removed from the circuit whenever a direct current battery of either polarity is applied at the central office. The inductors 34 and 36 allow the direct current to pass to the full wave rectifier comprising diodes 38, 40, 42, and 44. Inductors 46 and 48 then allow the direct current to pass through resistor 30 and inductor 32. The values for these latter two components can easily be chosen to cause a direct current voltage drop sufficient to reverse bias diode 18.

Figure 3:
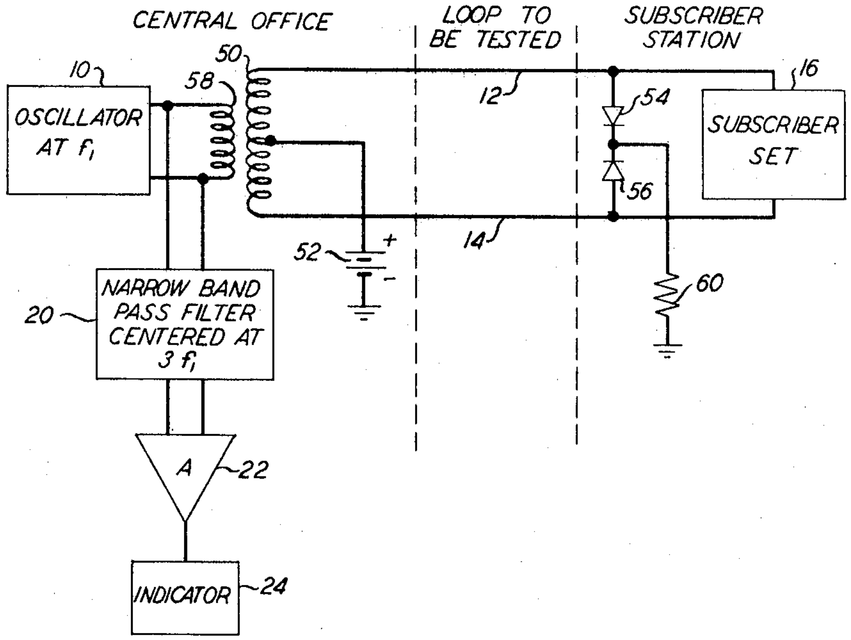

Another variation of the basic embodiment of the present invention capable of operating on lines likely to experience direct current conditions of either polarity is shown in FIG. 3. This circuit utilizes a direct current supply 52 having voltage $V_0$ and connected to the center tap of a transformer secondary 50 to forward bias both of the diodes 54 and 56. The oscillator 10, operating at the frequency $f_1$, is coupled into the loop by way of transformer primary 58. The peak amplitude relative to ground of the oscillator signal coupled into each half of the transformer secondary 50 is chosen to be somewhat above $V_0$.

During the portion of each half cycle that the amplitude of the oscillator signal applied to each half of the transformer secondary is less than $V_0$, there is a negligible potential drop, V, between the anode of diode 54 and that of diode 56. When the alternating current voltage so applied has an instantaneous magnitude greater than $V_0$ and opposite polarity, one of the diodes becomes reverse biased. A voltage drop then appears across the anode pair with magnitude related to the instantaneous difference between the voltage of the applied oscillator signal and the constant voltage, $V_0$. An identical but oppositely poled voltage drop will appear for the corresponding portion of the next half cycle. The polarity is opposite because it is the other diode that is reverse biased.

Figure 4:
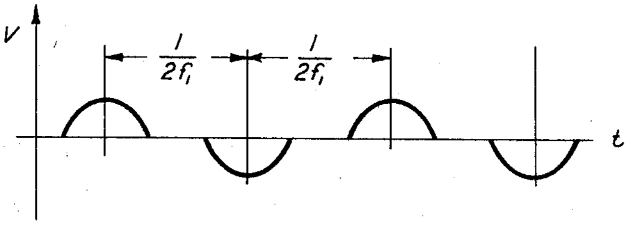
FIG. 4 shows a typical waveform encountered in one embodiment.

A voltage, V, having the general form indicated in FIG. 4 is thereby generated across the subscriber's termination. This type of signal is found to be particularly rich in third harmonic content. The actual amount of third harmonic present at the central office can be measured using a filter 62 with narrow pass band centered at frequency $3f_1$, and the previously mentioned amplifier 22 and indicator 24. Resistor 60 is included to provide a conduction path for the diodes 54 and 56. Once again, a calculation involving the applied signal power, the received harmonic power and the diode characteristic can be performed to determine the transmission loss.

When a talking battery is connected across the wire pair 12 and 14 at the central office and, as is customary, the positive side is grounded, one of the diodes 54 or 56 will be reversed biased. Under normal conditions this will prevent the diodes from loading the talking path. If unusually high level speech signals are present though, the unbiased diode might conduct momentarily and produce undesired unbalances. To eliminate this source of difficulty, a Zener diode could be connected in series with resistor 60. This diode would further prevent the rather low level talking signals from passing through diodes 54 and 56, but would break down under the assumed higher level testing signals.

It should be understood that the present invention is not limited to the embodiments shown in FIGS. 1 through 3 and described above. Although those embodiments illustrate many advantages of the invention, they by no means exhaust its possible areas of application nor its numerous virtues. Several aspects of the present invention not explicitly set forth above will now be discussed.

The diode shown in FIG. 1 was chosen to be a square law device but might easily have exhibited any other non-linear characteristic. For each specific diode a transfer relation between incident fundamental frequency power and resulting harmonic power can be determined. To be sure, any nonlinear or other harmonic generating device having predictable characteristics and being responsive to incident signals may be used if circumstances warrant. It may also prove advantageous to use more than a single fundamental frequency at the central office. For example, two nonharmonically-related frequencies $f_1$ and $f_2$ could be sent from the central office and the harmonics of each measured simultaneously at that location. This would make a single measurement more representative of the entire channel performance.

Many nonlinear devices exhibit harmonic generating characteristics which vary with the applied signal or with the operating or bias point. Thus, it is entirely possible that a given nonlinear device, when placed across a remote subscriber's set, or other remote station, and connected to a near end by a pair of conductors, could, in response to signal conditions imposed at both ends of the wire pair, give rise to different but predictable harmonic components. In particular, it would be possible to locally bias a given nonlinear device at a remote location to a point on its operating characteristic which is uniquely representative of the condition giving rise to that particular bias. The amplitude of a given harmonic frequency present at the near end of the wire in response to a fundamental frequency signal applied at the near end may then be interpreted to indicate the condition causing the bias.

Figure 5:
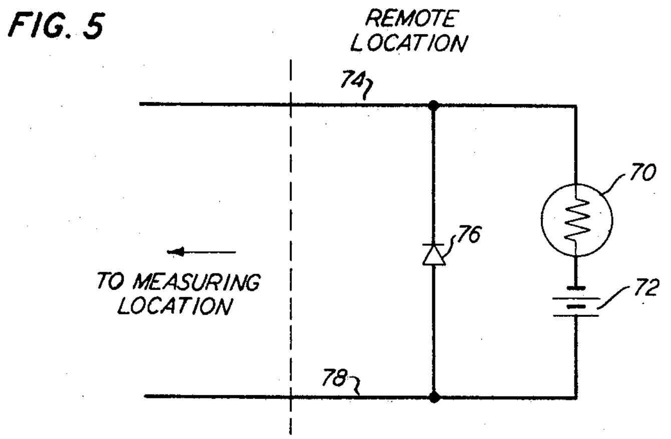
FIG. 5 shows an embodiment of the present invention adapted for telemetry application.

FIG. 5 illustrates a typical embodiment of a telemetric application of the present inventive concept. A temperature sensitive transducer comprising a battery 72 and a thermistor 70 provides a temperature dependent biasing current to a diode 76. The diode 76 is assumed to have a nonlinear transfer characteristic which is dependent on its quiescent operating point. Thus the amount of second harmonic energy, for example, which is present at the measuring location in response to a fundamental frequency signal sent to the remote location by way of wires 74 and 78, is indicative of the temperature at the remote location.

The transducer means shown in FIG. 5 is intended to be merely illustrative. Other biasing techniques could easily be applied. In particular, an arrangement for providing two or more discrete biasing currents could give a digital indication of the state of some variable at a remote terminal.

Numerous and varied other arrangements within the spirit and scope of the principles of the invention can, obviously, be readily devised by those skilled in the art. No attempt has been made here to exhaustively illustrate all such arrangements.

What is claimed is:

1. Apparatus comprising
- a source of alternating current signals of frequency $f_1$,
- a telephone subscriber's loop having a near and a far end,
- a square-law diode responsive to incident signals,
- means for applying said alternating current signals to said near end of said subscriber's loop,
- means for connecting said diode across said far end of said subscriber's loop,
- a narrow bandpass filter across said near end centered at frequency $2f_1$,
- a power meter responsive to signals passed by said filter,
- means provided by the reverse biasing of said diode by the talking battery associated with said subscriber's loop for effectively disconnecting said diode from said subscriber's loop whenever said subscriber's loop is to be used for normal transmission, wherein
- the transmission loss in decibels between said near and said far ends of said loop is given by $$L_1=\frac{2P_1-P_2+K}{3}$$

where $L_1$ is the loss to be measured, $P_1$ is power delivered by said source of alternating signals to said subscriber's loop, $P_2$ is the second harmonic power measured by said power meter, and K is a constant characteristic of said diode.

2. Apparatus comprising
- a source of alternating current signals of frequency $f_1$,
- a telephone subscriber's loop having a near and a far end,
- a diode responsive to incident signals,
- means for applying said alternating current signals to said near end of said subscriber's loop,
- means for connecting said diode across said far end of said subscriber's loop, said diode being arranged to be reverse biased by the talking battery associated with said subscriber's loop,
- a narrow bandpass filter across said near end centered at a selected harmonic of frequency $f_1$, and
- indicating means responsive to signals passed by said filter.

3. Apparatus as in claim 2 wherein said connecting means comprises a direct connection of the anode of said diode to one of the conductors of said loop and the cathode of said diode to the other conductor of said loop.

4. Apparatus as in claim 2 wherein said connecting means includes rectifier means.

5. Apparatus as in claim 2 further comprising transducer means at said far end arranged to modify the harmonic generating properties of said diode in response to an external condition.

6. Apparatus as in claim 5 wherein said transducer means comprises a battery in series with an impedance element, the impedance of which is dependent on said external condition.

7. Apparatus as in claim 4 wherein said rectifier means comprises bridge rectifier means with input connected across said loop, and output connected across said diode.

8. Apparatus as in claim 4 wherein said rectifier means comprises a second diode in series opposition with first said diode.

References Cited

UNITED STATES PATENTS 3,189,694 6/1965 Frankton ---------- 179—175.31

FOREIGN PATENTS 656,188 8/1951 England.

OTHER REFERENCES

King, G. H., and Binks, R., Maintenance, 17 (2), pp. 84–91, April 1961, ATE Journal.

KATHLEEN H. CLAFFY, Primary Examiner

D. W. OLMS, Assistant Examiner